United States Patent
Nams et al.

(10) Patent No.: US 11,333,756 B2
(45) Date of Patent: May 17, 2022

(54) TOWABLE SUBMERSIBLE DEVICE (71) Applicant: GEOSPECTRUM TECHNOLOGIES INC., Dartmouth (CA)

(72) Inventors: Janis Nams, Dartmouth (CA); Dan Cunningham, Dartmouth (CA); Paul Yeatman, Dartmouth (CA); Bruce A. Armstrong, Dartmouth (CA)

(73) Assignee: GEOSPECTRUM TECHNOLOGIES INC., Dartmouth (CA)

( * ) Notice: Subject to any disclaimer, the term of this patent is extended or adjusted under 35 U.S.C. 154(b) by 179 days.

(21) Appl. No.: 16/330,669

(22) PCT Filed: Aug. 28, 2018

(86) PCT No.: PCT/CA2018/051034
§ 371 (c)(1),
(2) Date: Mar. 5, 2019

(87) PCT Pub. No.: WO2019/041031
PCT Pub. Date: Mar. 7, 2019

(65) Prior Publication Data
US 2020/0400817 A1 Dec. 24, 2020

Related U.S. Application Data

(60) Provisional application No. 62/553,427, filed on Sep. 1, 2017.

(51) Int. Cl.
*G01S 15/42* (2006.01)
*B63B 21/66* (2006.01)
(Continued)

(52) U.S. Cl.
CPC ............ *G01S 15/42* (2013.01); *B63B 21/663* (2013.01); *G01S 7/521* (2013.01); *G01V 1/3826* (2013.01);
(Continued)

(58) Field of Classification Search
CPC .......... G01S 15/42; G01S 7/521; G01S 11/14; G01S 5/0027; G01S 5/26; G01S 15/003;
(Continued)

(56) References Cited

U.S. PATENT DOCUMENTS 5,062,085 A * 10/1991 Andrews, Jr. ........... F16F 13/00
367/20
6,239,363 B1 * 5/2001 Woofers .................... F16L 1/14
138/110
(Continued)

FOREIGN PATENT DOCUMENTS

WO 2017035660 A1 3/2017

OTHER PUBLICATIONS

Seto, The Interaction Dynamics of a Semi-Submersible Towing a Large Towfish (Year: 1998).*
(Continued)

*Primary Examiner* — Isam A Alsomiri
*Assistant Examiner* — Amie M Ndure
(74) *Attorney, Agent, or Firm* — McNees Wallace & Nurick LLC (57) ABSTRACT

A stable towable submersible device includes a rigid body that is towed at a positive pitch angle relative to the device's direction of motion. An acoustic projector housing extends vertically from the rigid body. When the rigid body rolls about its roll axis, which is tilted at the positive pitch angle, the acoustic projector rolls about the roll axis changing the acoustic projector's angle of attack relative to the direction of motion and generates a restoring force causing the acoustic projector to rotate back to a generally vertical orientation.

18 Claims, 10 Drawing Sheets

(51) Int. Cl.
*G01S 7/521* (2006.01)
*G01V 1/38* (2006.01)

(52) U.S. Cl.
CPC .... *G01V 1/3843* (2013.01); *G01V 2210/1293* (2013.01)

(58) Field of Classification Search
CPC ...... G01S 15/89; G01S 1/786; G01S 7/52004; B63B 21/663; B63B 21/66; B63B 2022/006; B63B 22/18; B63B 22/02; B63B 2211/06; B63B 27/36; B63B 1/04; B63B 1/242; B63B 2035/007; B63B 21/26; B63B 2211/00; B63B 2241/12; B63B 22/00; B63B 22/20; B63B 3/38; G01V 1/3826; G01V 1/3843; G01V 2210/1293; G01V 1/3817; G01V 1/3808; G01V 1/3835; G01V 1/38; G01V 1/201; G01V 1/3861; G01V 1/3852; G01V 1/186; G01V 2210/56; G01V 13/00; G01V 2001/207; G01V 2200/14; G01V 1/137; G01V 1/18; G01V 1/28; G01V 1/005; G01V 1/006; G01V 1/20; G01V 1/22; G01V 1/24; G01V 1/282; G01V 1/36; G01V 2210/127; G01V 2210/1423; G01V 2210/32; G01V 2210/34; G01V 11/00; G01V 1/003; G01V 1/02; G01V 1/133; G01V 1/16; G01V 1/162; G01V 1/166; G01V 1/168; G01V 1/189; G01V 1/202; G01V 1/284; G01V 1/30; G01V 1/301; G01V 1/308; G01V 1/34; G01V 1/362; G01V 2210/1212; G01V 2210/1427; G01V 2210/16; G01V 2210/165; G01V 2210/50; G01V 2210/51; G01V 2210/612; G01V 2210/64; G01V 2210/67; G01V 2210/74; G01V 3/083; G01V 3/165; B63G 8/14; B63G 8/24; B63C 11/52; Y02A 90/30; Y02A 90/36; B63H 11/02; B63H 19/08; B63H 25/46; F03B 17/061; F05B 2240/12; G01H 9/004; G01R 31/08; G05D 1/0208; H04B 11/00; H04B 13/02; Y02E 10/20; Y02E 10/28; Y10T 156/10; Y10T 29/4995

See application file for complete search history.

(56) References Cited

U.S. PATENT DOCUMENTS

| | | |
|---|---|---|
| 9,001,623 B1 | 4/2015 | Sharp et al. |
| 10,479,452 B2* | 11/2019 | Nams .................. G01V 1/3808 |
| 2009/0154295 A1* | 6/2009 | Ricard .................... B63G 8/42 367/154 |
| 2013/0182531 A1* | 7/2013 | Gagliardi ................ B63B 21/66 367/16 |
| 2014/0070977 A1* | 3/2014 | Stocke, Jr. ............ H01Q 17/00 342/1 |

OTHER PUBLICATIONS

Tossman, An Underwater Towed Electromagnetic Source for Geophysical Exploration. (Year: 1979).*

Mattioli, Experimental investigation of the wave-induced flow around a surface-touching cylinder. (Year: 2012).*

Hinz, Influence of heat transfer on the aerodynamic performance of a plunging and pitching NACA0012 airfoil at low Reynolds numbers. (Year: 2012).*

International Search Report for PCT/CA2018/051034 dated Nov. 22, 2018.

Written Opinion of the International Searching Authority for PCT/CA2018/051034 dated Nov. 22, 2018.

PCT/CA2018/051034, filed Aug. 28, 2019.

* cited by examiner

TOWABLE SUBMERSIBLE DEVICE

CROSS-REFERENCES TO RELATED APPLICATIONS

This application is a national stage application under 35 U.S.C. 371 based on international patent application PCT/CA2018/051034, filed on Aug. 28, 2018 which claims the benefit of U.S. Provisional patent application No. 62/553,427 filed on Sep. 1, 2017.

TECHNICAL FIELD

The current disclosure relates to a towable and submersible device and in particular to a towable and submersible device for a sound-transmitting projector.

BACKGROUND

A ship may tow a sound-receiving array and a sound-transmitting projector that together form an active sonar system. The sound projector emits pulses of sound that insonify objects. Echoes from the objects are detected by the receive array and, with suitable signal processing, the presence, bearing, and classification of objects can be inferred.

The ideal acoustic beam pattern from the sound projector is omnidirectional in a plane horizontal to the water surface. It is further desirable that little of the acoustic power is radiated vertically towards the water surface and bottom because this power increases the reverberation or background noise but does not illuminate the target with acoustic energy. Thus, acoustic energy transmitted in a vertical direction degrades detection performance.

A known means to accomplish the desired beam pattern is to use a sound projector that has a length similar to or greater than the wavelength of the sound being produced, as well as a width and depth that are small compared to the wavelength. Further, in order to produce the desired beam pattern, the projector is arranged so that the long axis of the sound projector is oriented vertically, i.e., pointing towards the ocean bottom and surface.

Underwater towed bodies, such as those used in towing a sound projector, typically have an elongated cylindrical or teardrop shape that provides stability to the body when towed. In order to fit a long sound projector vertically into such a body, and so produce the desired beam pattern, the tow body must also be large to accommodate the full length of the projector. Furthermore, these bodies are typically made stable by the addition of deadweight to the bottom, leading to not only a large, but also a heavy tow body. Such tow bodies require large and specialized handling systems, such as cranes, to deploy and recover from ships.

It is desirable to have a towable and submersible device that can carry a sound projector in a vertical orientation, that maintains good tow stability and/or may be handled using simple deck gear typically available on smaller vessels.

SUMMARY

In accordance with the present disclosure there is provided a towable submersible device comprising: a rigid body having a first end and a second end; and an elongated acoustic projector housing having a foil shape with a leading edge of the foil shape facing the first end of the rigid body, the acoustic projector housing connected to the rigid body so that a larger portion of the foil shape extends above the rigid body than extends below the rigid body when in use.

In a further embodiment of the towable submersible device, the acoustic projector housing is rotatably mounted to the rigid body and can be rotated between an operational position in which the acoustic projector housing is oriented vertically and a retrieval position in which the acoustic projector housing is received within the rigid body.

In a further embodiment, the towable submersible device further comprises an actuator for rotating the acoustic projector between the retrieval position and the operational position.

In a further embodiment of the towable submersible device, wherein the actuator maintains the acoustic projector housing in the operational position during operation.

In a further embodiment of the towable submersible device, the actuator comprises a motor or a linear actuator.

In a further embodiment, the towable submersible device further comprises at least one sensor for determining an orientation of the acoustic projector housing.

In a further embodiment of the towable submersible device, wherein the acoustic projector is removably mounted to the rigid body.

In a further embodiment, the towable submersible device further comprises a front connector for attaching to a tow cable and an aft connector for attaching to a second tow cable.

In a further embodiment of the towable submersible device, in use the towable submersible device is towed at a positive pitch angle and maintains a stable roll equilibrium due to a hydrodynamic restoring force generated by the foil shape of the acoustic projector housing.

In a further embodiment of the towable submersible device, the hydrodynamic restoring force is generated by the positive pitch angle exposing the acoustic projector housing to side flow when the towable submersible device rolls, a location of a net hydrodynamic restoring force generated by the acoustic projector being centered above a roll axis of rigid body resulting in a restoring moment.

In a further embodiment, the towable submersible device further comprises a flexible bridle fastened to the rigid body, the flexible bridle having a front connector for attaching to a tow cable and an aft connector for attaching to a second tow cable.

In a further embodiment of the towable submersible device, the second tow cable is for a tow-behind receiver array.

In a further embodiment of the towable submersible device, the flexible bridle is fixed to the rigid body at a central location of the rigid body to allow the flexible bridle to bend away from the rigid body.

In a further embodiment of the towable submersible device, the flexible bridle comprises a front yoke having a pair of arms and rear yoke having a pair of arms with each the arms of the front yoke joined to respective arms of the rear yoke by a plurality of rigid links rotatably connected together, wherein the arms of the front yoke are located on opposite sides of the acoustic projector housing and arms of the rear yoke are located on opposite sides of the rigid body.

In a further embodiment of the towable submersible device, the flexible bridle is connected to the rigid body at one rigid link on each side of the rigid body.

In a further embodiment of the towable submersible device, the rigid body is removably fastened to the flexible bridle.

In accordance with the present disclosure there is further provided a towable submersible device comprising: a rigid body adapted for towing behind a vessel; and a lift generating surface providing the towable submersible device with a net center of lateral lift located above a roll axis of the rigid body when the lift generating surface is exposed to a sideflow.

In a further embodiment of the towable submersible device, when the rigid body is towed at a positive pitch angle and rolled about the roll axis, the lift generating surface generates a correcting force that tends to restore the rigid body to a generally upright orientation.

In a further embodiment of the towable submersible device, the lift generating surface is rigidly fixed to the rigid body.

In a further embodiment of the towable submersible device, the rigid body defines an interior volume for receiving a payload.

BRIEF DESCRIPTION OF THE DRAWINGS

Features, aspects and advantages of the present disclosure will become better understood with regard to the following description and accompanying drawings in which.

DETAILED DESCRIPTION

A towable and submersible device for a sonar array is described further herein. The towable and submersible device, referred to further herein as a tow body for brevity, provides a housing for a sound projector and can be handled and stored on a common winch along with tow cables and receive arrays. The tow body can be deployed, retrieved and stored using simple deck gear such as a winch, while still positioning a sound projector in a stable orientation for producing a desirable beam pattern. The tow body uses a rotating acoustic projector that can transition between a largely vertical position when deployed for use and an inline position for retrieval, handling and storage. While this approach provides desirable deployment and retrieval characteristics, it can result in undesirable stability characteristics for the tow body during use. In order to provide tow stability, the tow body has a rotatable, protruding vertical sound projector housing shaped like a foil and exposed to the water flow. The foil shape of the projector housing is arranged so that a leading edge of the foil is pointing in the tow direction of the tow body. The tow body and projector housing are configured such that the exposed projector housing generates correcting, or stabilizing, hydrodynamic forces, rather than exciting, or destabilizing, forces. The correcting forces are generated from the roll of the tow body when it is towed at a positive pitch angle relative to the tow body's direction of motion. The use of hydrodynamic forces to provide stability allow the tow body to use minimal deadweight and other stabilizing devices such as additional wings or stabilizers.

Tow stability, and in particular roll stability, of sonar tow bodies is crucial to ensure proper orientation of the sound projector. Traditional tow bodies rely on simple, roughly symmetrical shapes to limit un-balanced hydrodynamic forces, and use a combination of weight and aft-ward fins to correct for the small unbalanced forces that do arise. In contrast, the current tow body is able to provide roll stability to a vertically oriented sound projector located within a projector housing when being towed, even at high speeds, using hydrodynamic forces generated by the projector housing. Further, the tow body allows the projector housing to be rotated into an inline position in order to facilitate deployment, retrieval and handling operations using simple deck gear.

The tow body described herein provides a sonar projector tow body, which produces favourable beam patterns while remaining small in size and light in weight, so as to be able to be handled and stored on a winch, as well as remaining stable under tow even at high speeds.

Figure 1:
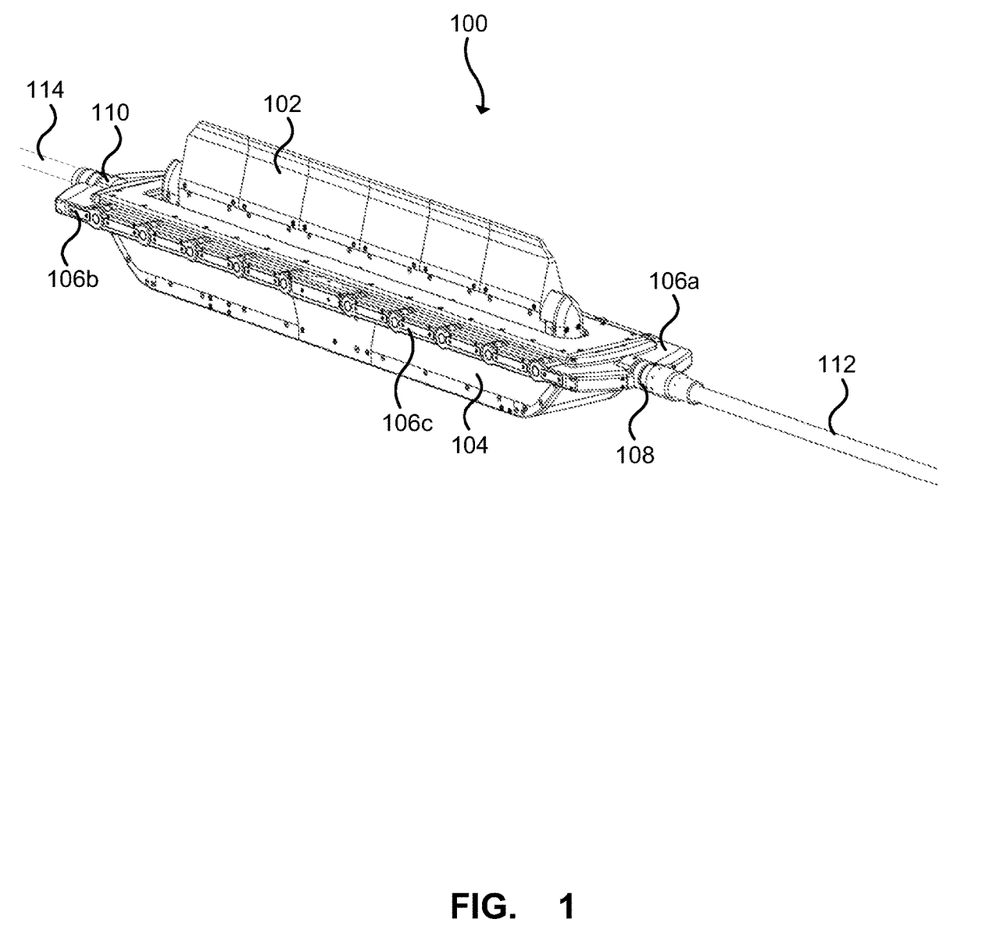
FIG. 1 depicts a towable submersible device with an acoustic projector arranged in a stowed position.
Figure 2:
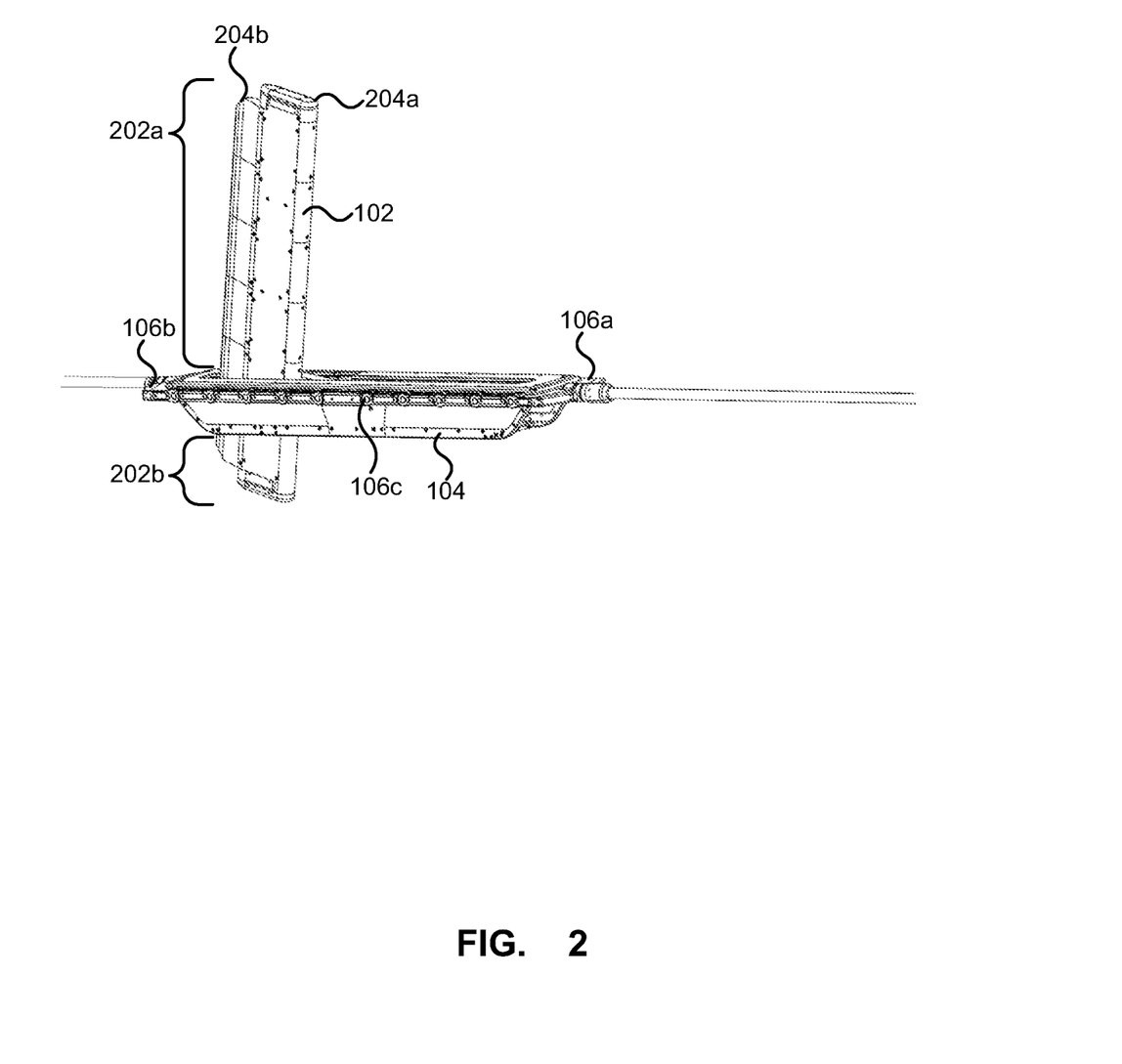
FIG. 2 depicts the towable submersible device with the acoustic projector arranged in a deployed position.
Figure 3:
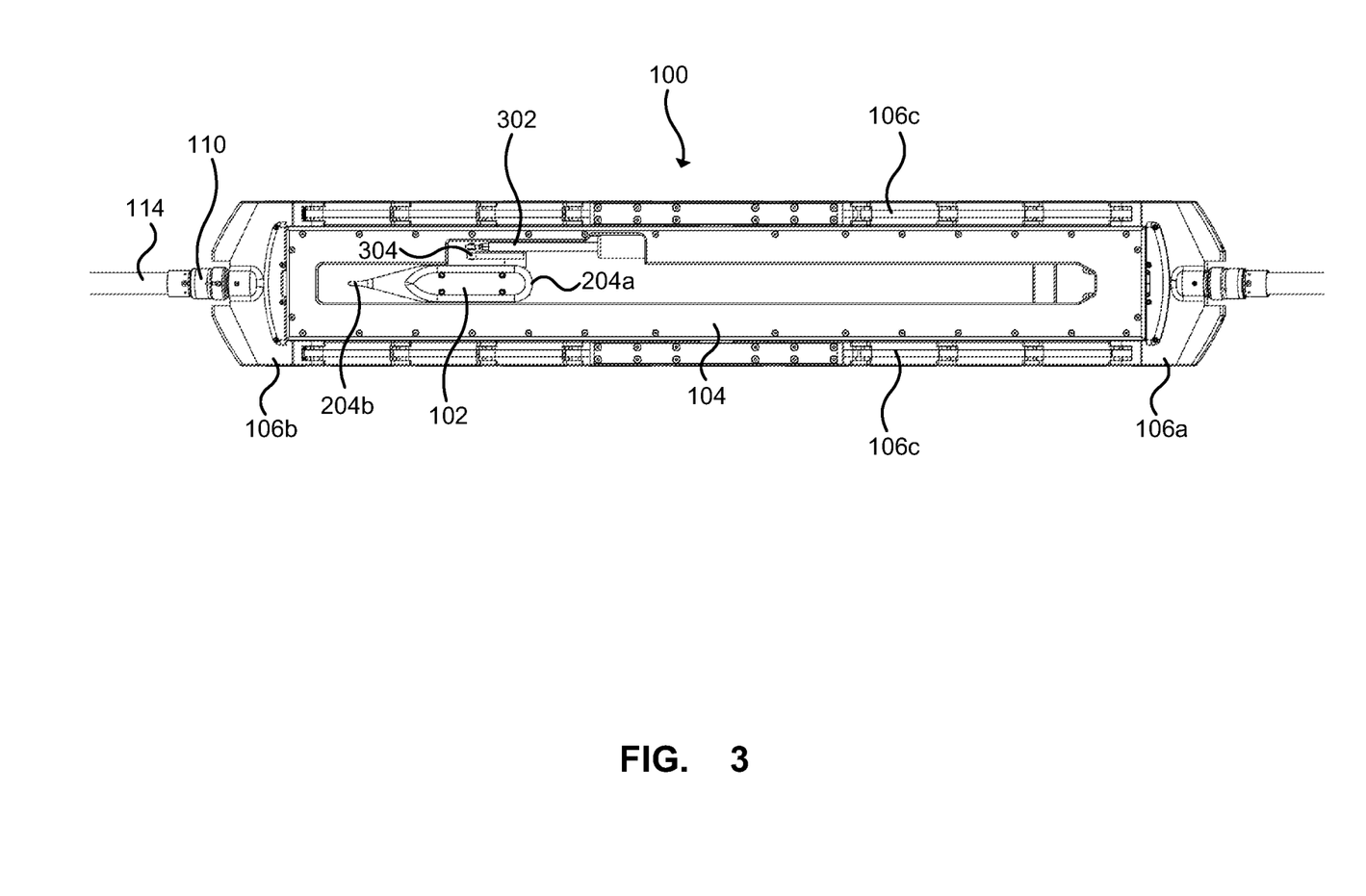
FIG. 3 depicts a top view of the towable submersible device with the acoustic projector arranged in a deployed position.

FIG. 1 depicts a tow body with an acoustic projector arranged in a stowed position. FIG. 2 depicts the tow body with the acoustic projector arranged in a deployed position. FIG. 3 depicts a top view of the towable submersible device with the acoustic projector arranged in a deployed position. The acoustic projector is arranged to be vertical in FIG. 3. The tow body 100 includes an acoustic projector housing 102 mounted to a rigid body 104. The projector housing 102 encloses an acoustic projector, or may be the exterior housing of the acoustic projector. The projector housing 102, and so the acoustic projector, can be rotated in the rigid body 104. In the deployed position, the projector housing 102 extends vertically, while in the recovery position, the projector housing fits within the rigid body 104 in order to have a smaller cross-section to facilitate deployment and recovery operations. The rigid body 104 may be surrounded by a flexible bridle having a front yoke 106a, and a rear yoke 106b connected together by a plurality of connected rigid links 106c (referred to collectively as bridle 106 for brevity). Each arm of the yokes 106a, 106b are located on opposite sides of the rigid body 104 so as to pass around the projector housing 102. Respective arms of the front and back yokes are connected by a plurality of rigid links 106c. The bridle 106 may be fastened to the rigid body 104 at a central location on each side of the rigid body 104 near the middle of the rigid body 104, as depicted more clearly in FIG. 8. The bridle 106 includes a front connector 108 and an aft connector 110 that are fastened to forward tow cable 112 and an aft tow cable (not shown) respectively. The tow cables can provide sufficient strength to tow the tow body and other towed devices such as the receive array as well as provide electrical connections to the towed devices. The bridle 106 can provide flexibility to a portion of the tow body, which may help with storage of the tow body 100 on a winch or drum. Although the bridle 106 may be beneficial, it is not necessary, and if omitted, the front connector 108 and aft connector 110 may be connected to, or part of, the rigid body 104.

The projector housing 102 may be mounted to the rigid body 104 on a pivoting mount that allows the projector housing 102 to rotate between a vertical orientation, or operational position, when in use, as depicted in FIG. 2, and an inline orientation, or retrieval position, with the projector housing 102 at least partially received within the rigid body 104, as depicted in FIG. 1, when being retrieved or deployed. An actuator can rotate the projector housing 102 between the inline and vertical positions, or to any position in between. The actuator may be, for example an electric or hydraulic actuator such as a motor or other type of actuator including a linear actuator 302 as depicted in FIG. 3. The linear actuator 302 may be connected to the projector housing 102 directly or indirectly, such as through an offset arm 304 as depicted in FIG. 3. The projector housing 102 may be maintained at an absolute approximate vertical orientation regardless of the pitch of the rigid body 104. That is, the pitch angle that the rigid body 104 is towed at may change, which can be sensed and adjusted for to maintain the projector housing 102 in a vertical orientation. The sensing of the vertical alignment of the projector housing 102 may be determined using various sensors, including accelerometers, gyroscopes, rotational sensors on the pivot connection, etc.

While the projector housing 102 is in the vertical position, it presents a large vertical surface area, parallel to the direction of motion. An upper portion 202a of the projector housing 102 extends above the rigid body 104 and a lower portion 202b of the projector housing 102 extends below the rigid body 104. The projector housing 102, or at least a portion of the upper portion 202a of the projector housing 102, has a foil shape with a leading edge 204a and a trailing edge 204b so that the projector housing 102 acts as a foil, or wing protruding above the rigid body 104 and bridle 106. The leading edge 204a of the foil shape points towards the front of the rigid body 104 and bridle 106. The projector housing 102 is mounted to the rigid body 104 so that a larger portion of the foil shape extends above the rigid body 104 than extends below during use. This may be achieved by locating the pivot connection off-set from the longitudinal center of the projector housing 102 so that more of the projector housing 102 extends above the rigid body 104, by modifying the shape of the projector housing 102 that extends below the rigid body 104 to no longer act as a foil, or a combination there of. The profile of the foil shape can be seen in FIG. 3. The particular profile and shape of the foil may be varied to change drag characteristics and flow characteristics of the foil.

Figure 4:
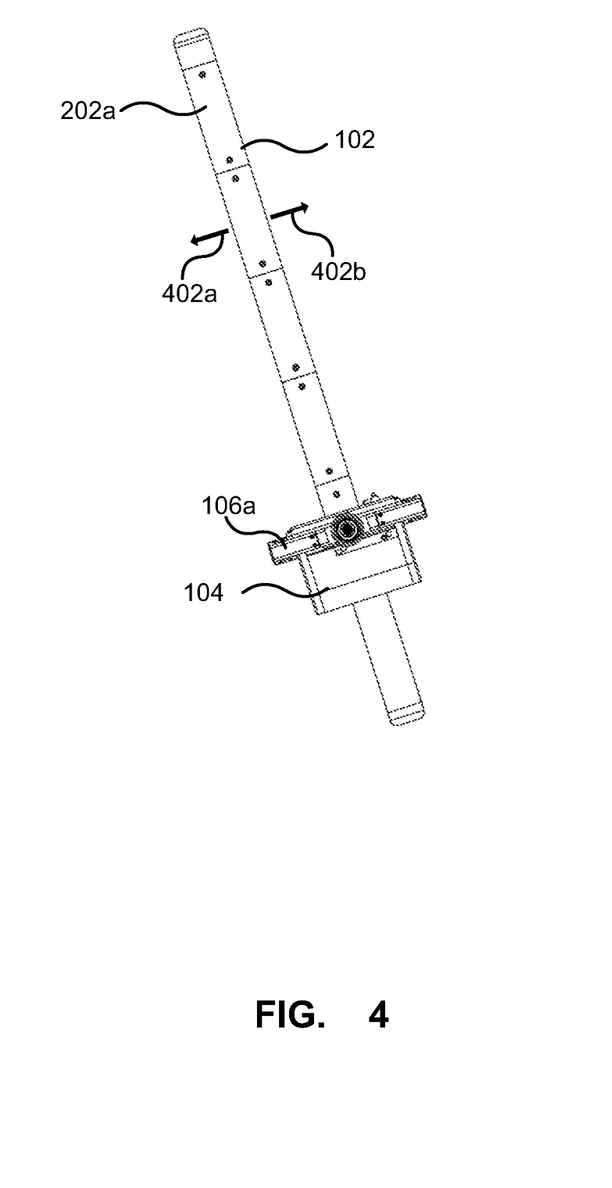
FIG. 4 depicts the towable submersible device in a rolled orientation.

FIG. 4 depicts the tow body in a rolled orientation. If the tow body 100 is towed in a generally horizontal orientation and the tow body 100 is rolled, the projector housing 102, or at least the upper portion 202a of the projector housing 102, generates equal, but opposite, lateral forces depicted by arrows 402a, 402b resulting in a no net lateral forces and as such no restoring force is present.

Figure 5:
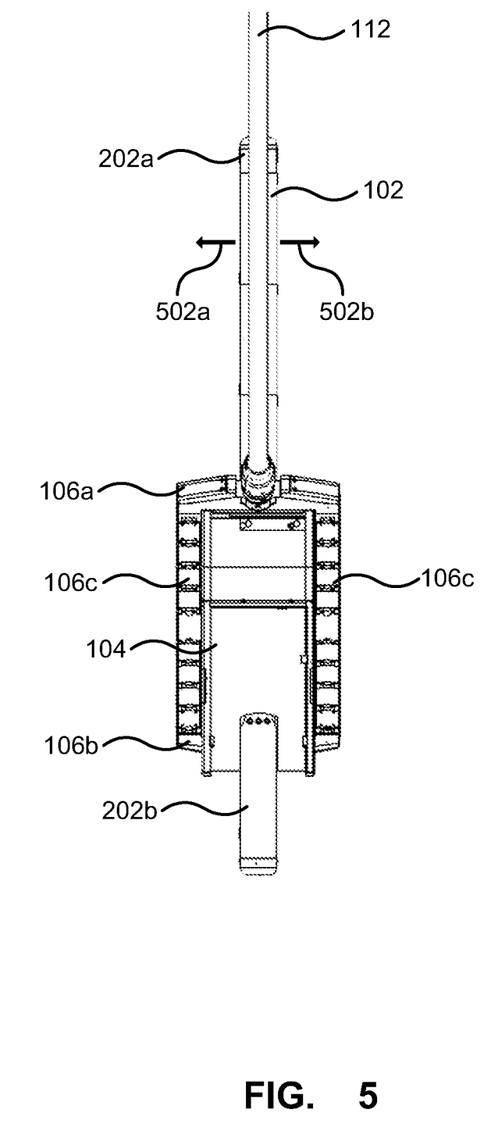
FIG. 5 depicts the towable submersible device in a pitched orientation.

FIG. 5 depicts the tow body in a pitched orientation with the projector housing orientated vertically. When the tow body 100 is towed in a pitched orientation with the projector housing 102 vertical, the projector housing 102, or at least the upper portion 202a of the projector housing 102, generates equal, but opposite, lateral forces 502a, 502b resulting in a no net lateral forces.

Figure 6:
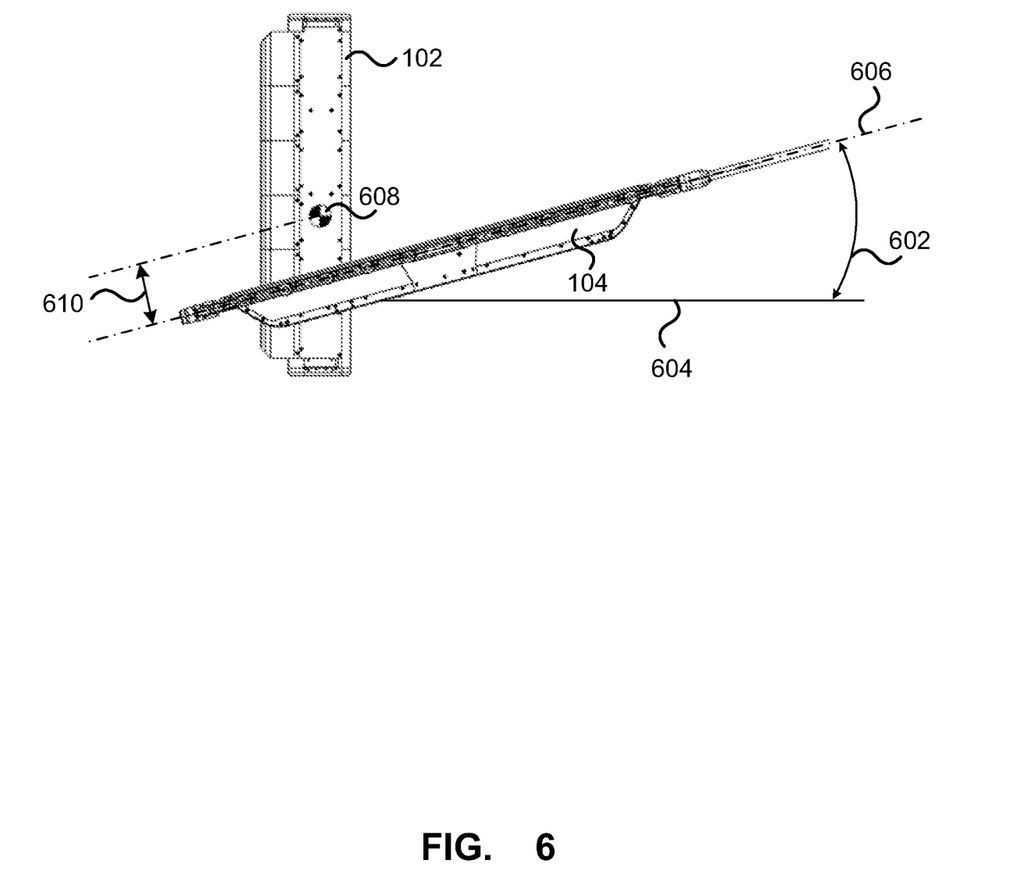
FIG. 6 depicts a side view of the towable submersible device in a pitched orientation.

FIG. 6 depicts the tow body in a pitched orientation. The tow body 100 is towed at a positive pitch angle 602 relative to the tow direction 604 of the tow body 100. The pitch angle may be measured between the direction of motion or tow direction 604 and the roll axis 606 of the rigid body. The roll axis may be along the longitudinal axis of the rigid body 104 connecting the front connector 108 and the aft connector 110. The pitch angle 602 between the tow direction 604 and the roll axis 606 may be about 10° although the pitch angle will depend upon the speed at which the tow body 100 is towed. When towed at a positive pitch angle with the projector housing 102 rolled to one side, the projector housing 102 will generate unequal lateral forces with the net force 608 acting on the projector housing being located a distance 610 above the roll axis. With the rigid body 104 towed at a positive pitch angle 602, the projector housing 102 will generate a restoring force when the rigid body 104 and projector housing 102 are rolled about the roll axis, causing the projector housing 102 and rigid body 104 to rotate back to a vertical orientation.

The offset distance 610, or the distance above the roll axis the net center of lateral lift 608 when exposed to a sideflow is located, is enough to provide desired stability to the tow body. The specific distance may be relatively small, such as about an inch, or larger depending on various factors. The tow body 100 may have the projector housing offset vertically from its center by approximately 11.5 inches, which is approximately 20% of the overall length of the projector housing. By physically offsetting the projector housing, the net center of lateral lift generated by the projector housing when exposed to a sideflow is also vertically offset above the roll axis. The physical offset of the projector housing may be larger than the offset of the net center of the lateral lift. Factors that may change the location of the net center of the lateral lift include a roll axis that may not be perfectly aligned with the rigid body, as well as a nose of the rigid body that can shield some of the upper portion of the projector housing 102 when towed in a pitched orientation, resulting in less lift generation. Further, the location of the net center of the lateral lift may change with different pitch and tow speeds.

Figure 7:
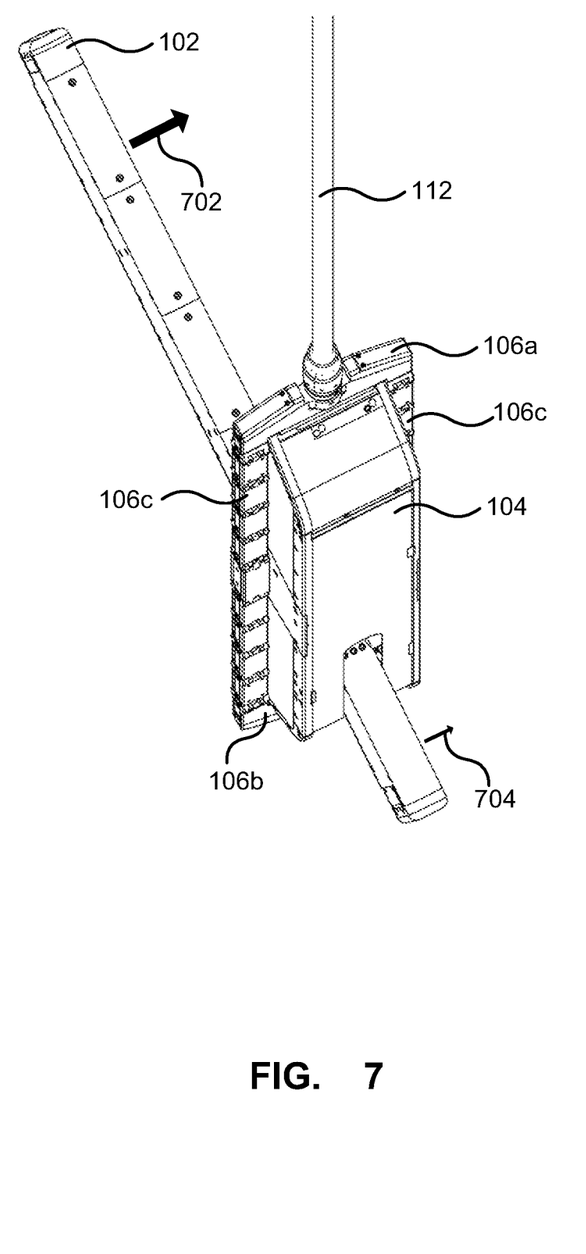
FIG. 7 depicts the towable submersible device in a pitched and rolled orientation.

FIG. 7 depicts the tow body in a pitched and rolled orientation. The rigid body 104 takes up a pitch angle when towed, due to a combination of weight and hydrodynamic forces, including those of a towed receiver array connected to the a tow cable at the aft connector 110. The roll axis is also pitched, and when the projector housing 102 rolls about the pitched roll axis, the angle of attack of the projector housing 102 changes and no longer generates equal but opposite lateral forces. Instead, the projector housing 102 generates a larger restoring force 702 that will cause the projector housing 102 to rotate back to the vertical orientation. The lower portion of the projector housing 102 may generate a countering force 704; however as a result of the shorter length of the lower portion extending below the rigid body 104 compared to the upper portion, the countering force 704 is smaller than that of the restoring force 702, and as such there is a net force tending to restore the projector housing 102 to the vertical orientation.

If the tow body 100 takes up a roll angle, it causes the foil surfaces of the projector housing 102 which were previously vertical, and therefore parallel to the water velocity and creating equal but opposite forces, to rotate not only away from vertical, but also into a position where the surfaces are inclined to the flow, and take up an angle of attack, causing the foil surfaces to generate a net restoring force. This is because the roll axis is not parallel to the water velocity. When the foil surfaces take up an angle of attack relative to the flow, they generate lift force. Any of the foil surfaces below the roll axis generate lift which tend to push the tow body further away from 0 degrees roll, i.e. an exciting force. Any of the foil surfaces above the roll axis generate lift which tend to push the body back toward 0 degrees roll, i.e. a restoring force.

The vertical projector housing 102 provides the parallel vertical surface area, and is distributed primarily above the roll axis, that is more of the foil surface of the projector housing 102 extends above the rigid body 104 than extends below the rigid body 104. As a result of distribution of the foil surface, the net center of lateral lift generated during such a roll of the tow body is located above the roll axis, meaning that a net restoring force is experienced. As a result, any time the tow body 100 rolls, it is naturally pushed back toward the upright position, leading to a roll-stable tow device that can be easily deployed and recovered.

Figure 8:
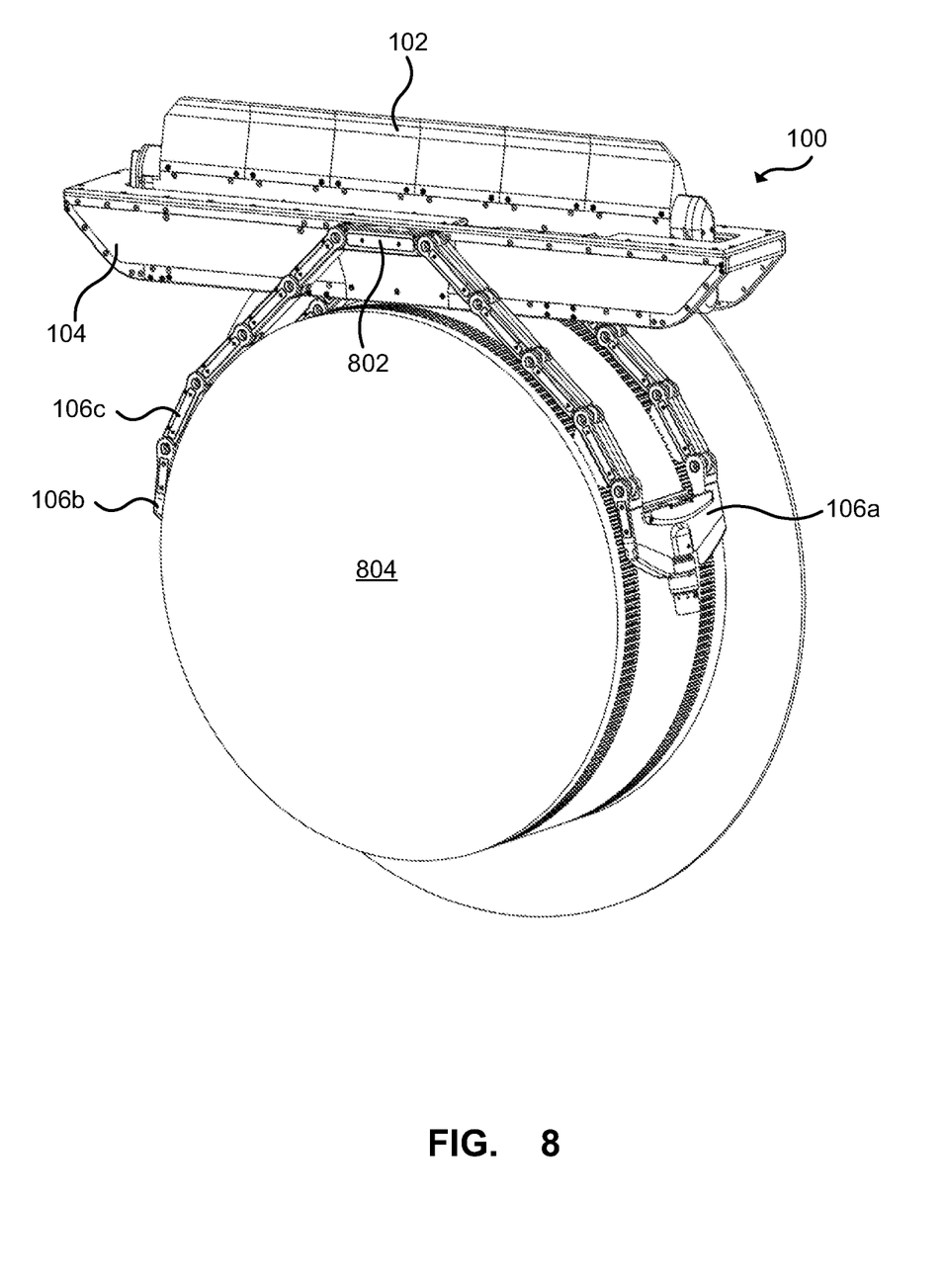
FIG. 8 depicts the towable submersible device stowed on a drum.

FIG. 8 depicts the tow body stowed on a drum. The bridle 106 is free to bend downward, away from the rigid body 104 and projector housing 102, except at the middle 802 where it is fastened. The rigid body 104 and projector housing 102 may be permanently fixed to flexible bridle 106 or may be removably fastened to the flexible bridle 106. The towing tension, both for the tow body and a cable and receiver array towed behind it, is carried on a flexible bridle member. This allows the tow body 100 to be stored, deployed, and recovered in a similar manner to common flexible components, like cables and arrays. Specifically, this allows the tow body 100, or at least the flexible bridle 106 that the rigid body 104 can be attached to, to be stored on, and deployed/recovered with, a winch, while remaining inline between the tow cable and receive array. The body/bridle can include gear tooth elements which interlock with similar elements on the winch drum 804, to help retain the tow body on the winch drum 804.

The tow body described above allows the use of a vertical sound projector that provides favourable acoustic beam patterns. The towable device may have a small form factor and flexible bridle that allows the tow body to be stored on and deployed from a single winch, along with accompanying array and tow cables, rather than requiring a separate handling system. This allows the system to be used on small vessels which typically cannot support a large sonar array handling system. With the projector housing able to be pivoted inline with the tow cable, it can be deployed/recovered through a small opening in a ship. The hydrodynamic design gives the tow body roll stability without relying on conventional stability features which are large and heavy. In use the tow body is towed at a positive pitch angle and maintains a stable roll equilibrium due to a hydrodynamic restoring force generated by the foil shape of the projector housing. The hydrodynamic restoring force is generated by the positive pitch angle of the tow body exposing the acoustic projector housing to side flow when the towable submersible device rolls, the location of the net hydrodynamic restoring force generated by the acoustic projector housing being centered above the roll axis of the rigid body resulting in a restoring moment that tends to return the tow body to the upright, or zero-roll, position. The projector housing may also be pivoted to the inline position while being towed to reduce tow body drag, in the event of high-speed ship maneuvers (sprint). The tow body may use a modular design that allows the projector housing to be removed/replaced without dismantling or interfering with the rest of the body/system.

The towable submersible device described above, as well as other towable devices, were tested using full-scale models, scale models as well as computational fluid dynamic (CFD) analysis. Various CFD analyses were performed predicting the roll moment, or force, experienced by the body in various configurations when rolled. These models predict a restoring moment with an offset projector housing, but not with a centered projector housing.

A full scale model similar to the towable submersible device described above, but with the projector foil centered vertically so that the center of the net lateral lift was located at or below the roll axis, was towed at a positive pitch angle. The centered foil arrangement demonstrated poor stability and performed many complete barrel rolls during testing. The centered foil arrangement was tested with approximately 16 kg of deadweight ballast added to the bottom of the projector and rigid body. While the added deadweight helped to keep roll to approximately +/−15° of roll at slow speeds of about 6 knots, the roll stability quickly degraded to about +/−50-60° of roll at 10 knots. While the tow speeds were kept to a maximum of approximately 10 knots, it would be expected that the roll stability with deadweight would continue to degrade with increased speed. In contrast, when the same model was adjusted to have the foil projector raised from the rigid body in approximately the same arrangement as depicted above, the towed body stayed within approximately +/−15° of roll, even at higher speeds. Subsequent refinements to the design, resulting in the towable submersible device depicted above can achieve improved stability with approximately +/−3 of roll, even at higher speeds.

Both full sized and scale models were tested to determine possible performance differences resulting from different offsets of the projector housing. A full size prototype was tested with the projector offset a maximum amount. Compared to the offset depicted above, no significant improvement in roll stability was found. Scale models were tested with varying amounts of offset, both more and less than the offset distance of the above described submersible towable device. None of the scale models performed significantly better than the submersible towable device described above. It was found that a physical offset of the projector housing of about 5 inches still provided sufficient offset of the net center of lateral lift above the roll axis to provide noticeable roll-stabilizing force.

The above has described a stable tow body particularly suited for use in a towed sonar system to house the sound projector. The above described tow body has a projector housing extending above the rigid body. The projector housing generates a lateral lift when exposed to a sideflow that is centered above a roll axis of the rigid body. With the center of the lateral lift located above the roll axis, the force tends to provide a restoring force to return the body to neutral when rolled. While the submersible towable device was designed for particular use with acoustic projectors, the same concept can be applied to provide a towable submersible device that maintains roll stability. Such a body could be useful in providing a housing for other sensors including, for example imaging devices, gyroscopes, accelerometers, etc. Such a submersible towable device is depicted in FIGS. 9 and 10.

Figure 9:
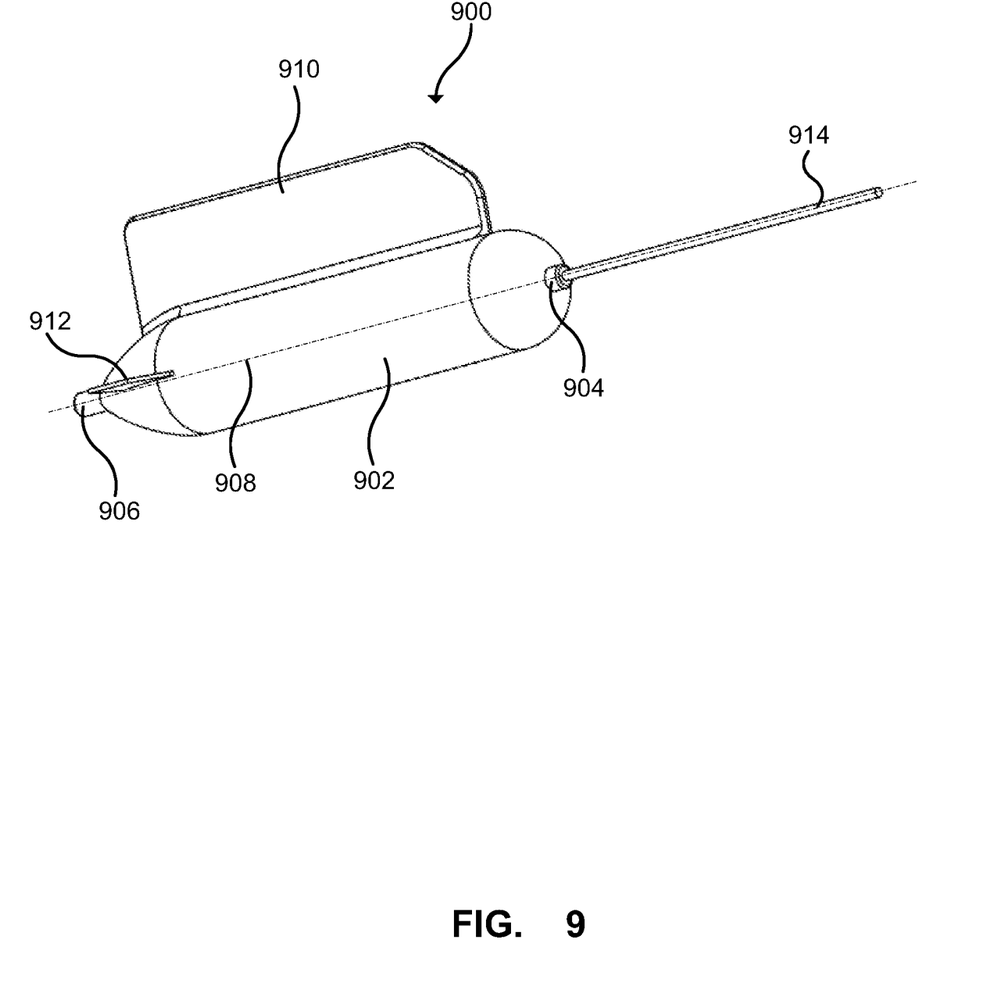
FIG. 9. depicts a perspective view of an alternative towable submersible device.
Figure 10:
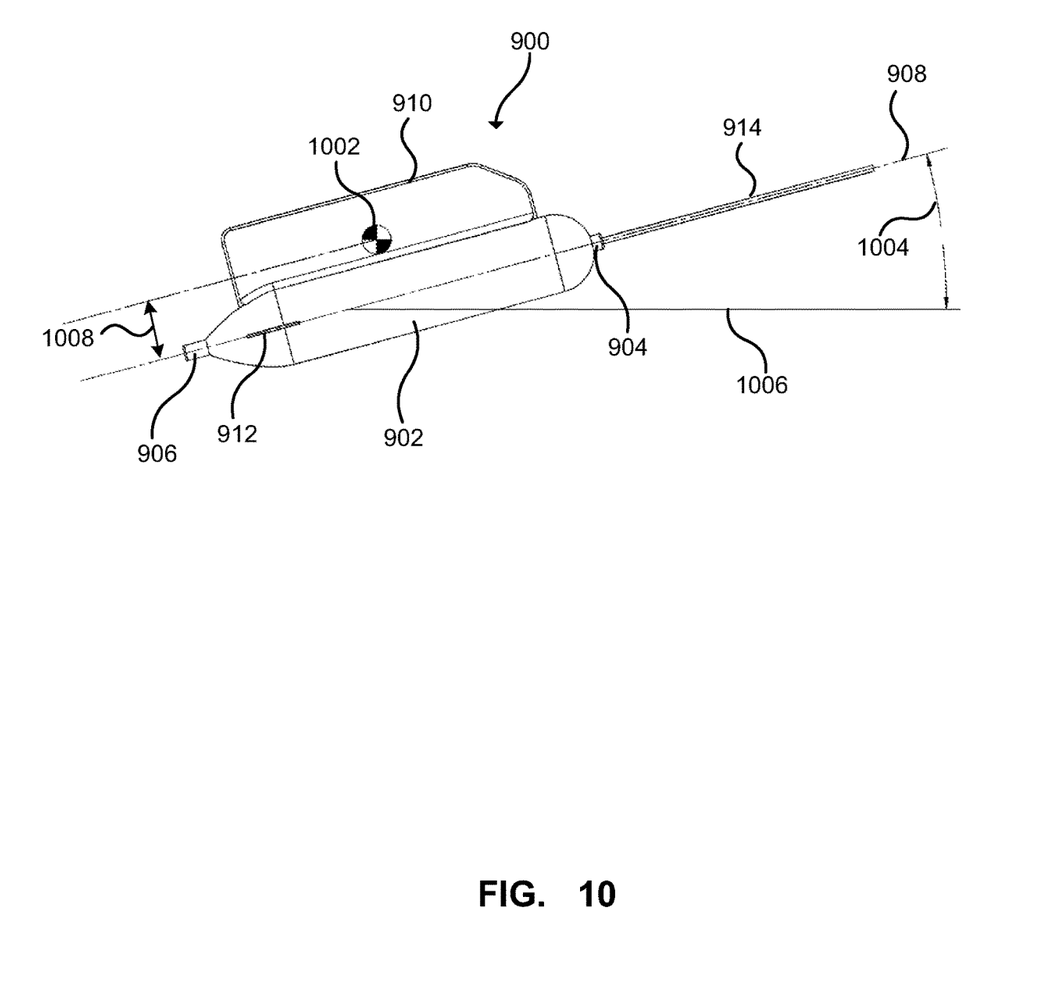
FIG. 10 depicts a side view of the alternative towable submersible device.

FIG. 9. depicts a perspective view of an alternative towable submersible device. FIG. 10 depicts a side view of the alternative towable submersible device. The towable submersible device 900 has a rigid body 902 that has a front end connector 904 and a back end connector 906. The rigid body 902 may provide an interior volume that may be used to carry a desirable payload, such as electronics, sensors, or other types of payloads. Both the front end connector 904 and back end connector 906 allow connections to tow lines, and possibly electrical connections to be made. The back end connector 906 may be omitted if no additional devices are to be towed behind the towable submersible device 900.

The rigid body 902 has a roll axis 908, depicted as generally between the front end connector 904 and back end connector 906 although the roll axis need not be aligned with the connectors. The rigid body further comprises a lift generating surface 910 extending above the rigid body. The lift generating surface 910 generates lateral lift when exposed to a sideflow. The lift generating surface 910 may be exposed to a sideflow when the towable submersible device is rolled while towed at a positive pitch angle 1004 so that the roll axis 908 is towed at a positive angle relative to horizontal 1006. The lift generating surface 910 may have any shape that generates lateral lift when exposed to a sideflow. For example, the acoustic projector housing 102, which provides a lift generating surface, has a foil shape that generates the lateral lift when exposed to a sideflow, however other lift generating shapes may be used as long as they generate the described lateral lift when the towable submersible device is rolled to either side of center.

The lift generating surface is arranged such that the net center of the generated lateral lift 1002 is offset above the roll axis 908 by a distance 1008 sufficient to provide desired roll stability characteristics. Although the lift generating surface 910 provides lateral lift, additional surfaces of the rigid body may also generate lateral lift. It is the net center of the total lateral lift generated by all surfaces of the submersible device that is vertically offset above the roll axis of the rigid body. Although the particular roll stability characteristics will depend upon a number of factors, including acceptable performance for a particular application, an offset of about 1 inch may provide acceptable roll stability. The towable submersible device 900 may include additional fins 912 that may provide stabilizing forces to the tow device. In particular, the fins 912 may help provide pitch stability to the towable submersible device 900 when being towed by a tow capable 914.

The towable submersible device of FIGS. 1-8 and the towable submersible device of FIGS. 9 and 10 both have a lift generating surface that provides lateral lift when exposed to a sideflow with the net center of the generated lateral lift being offset above a roll axis of the towable submersible devices. Offsetting the net center of generated lateral lift above the roll axis as described provides a restoring force to the towable submersible device when it rolls of center while being towed at a positive pitch angle.

One or more illustrative embodiments have been described by way of example. It will be understood to persons skilled in the art that a number of variations and modifications can be made without departing from the scope of the invention as defined in the claims.

What is claimed is:

1. A towable submersible device, comprising:
   a rigid body having a front end and a back end opposite the front end, the rigid body configured to be towed at a positive pitch angle when in use; and
   an elongated acoustic projector housing having a foil shape with a leading edge of the foil shape facing the front end of the rigid body when in use, the acoustic projector housing connected to the rigid body at a location between the front end and back end so that a larger portion of the foil shape extends above the rigid body than extends below the rigid body when in use, causing the foil shape to take up an angle of attack when the rigid body rolls while being towed at the positive pitch angle resulting in a net restoring force being generated, thus providing roll stability to the towable submersible device.

2. The towable submersible device of claim 1, wherein the acoustic projector housing is rotatably mounted to the rigid body and can be rotated between an operational position in which the acoustic projector housing is oriented vertically and a retrieval position in which the acoustic projector housing is received within the rigid body.

3. The towable submersible device of claim 2, further comprising an actuator for rotating the acoustic projector between the retrieval position and the operational position.

4. The towable submersible device of claim 3, wherein the actuator maintains the acoustic projector housing in the operational position during operation.

5. The towable submersible device of claim 3, wherein the actuator comprises a motor or a linear actuator.

6. The towable submersible device of claim 2, further comprising at least one sensor for determining an orientation of the acoustic projector housing.

7. The towable submersible device of claim 1, wherein the acoustic projector is removably mounted to the rigid body.

8. The towable submersible device of claim 1, further comprising a front connector for attaching to a tow cable and an aft connector for attaching to a second tow cable.

9. The towable submersible device of claim 1, further comprising a flexible bridle fastened to the rigid body, the flexible bridle having a front connector for attaching to a tow cable and an aft connector for attaching to a second tow cable.

10. The towable submersible device of claim 9, wherein the second tow cable is for a tow-behind receiver array.

11. The towable submersible device of claim 9, wherein the flexible bridle is fixed to the rigid body at a central location of the rigid body to allow the flexible bridle to bend away from the rigid body.

12. The towable submersible device of claim 9, wherein the flexible bridle comprises a front yoke having a pair of arms and rear yoke having a pair of arms with each of the arms of the front yoke joined to respective arms of the rear yoke by a plurality of rigid links rotatably connected together, wherein the arms of the front yoke are located on opposite sides of the acoustic projector housing and arms of the rear yoke are located on opposite sides of the rigid body.

13. The towable submersible device of claim 12, wherein the flexible bridle is connected to the rigid body at one rigid link on each side of the rigid body.

14. The towable submersible device of claim 9, wherein the rigid body is removably fastened to the flexible bridle.

15. A towable submersible device, comprising:
   a rigid body configured to be towed at a positive pitch angle behind a vessel when in use; and
   a lift generating surface that provides the towable submersible device with a net center of lateral lift located above a roll axis of the rigid body when the lift generating surface is fully submerged and exposed to a sideflow caused by the rigid body rolling while being towed at the positive pitch angle.

16. The towable submersible device of claim 15, wherein when the rigid body is towed at the positive pitch angle and rolled about the roll axis, the lift generating surface takes up an angle of attack and generates a correcting force that tends to restore the rigid body to a generally upright orientation.

17. The towable submersible device of claim 15, wherein the lift generating surface is rigidly fixed to the rigid body.

18. The towable submersible device of claim 15, wherein the rigid body defines an interior volume for receiving a payload.

* * * * *